UNITED STATES PATENT OFFICE.

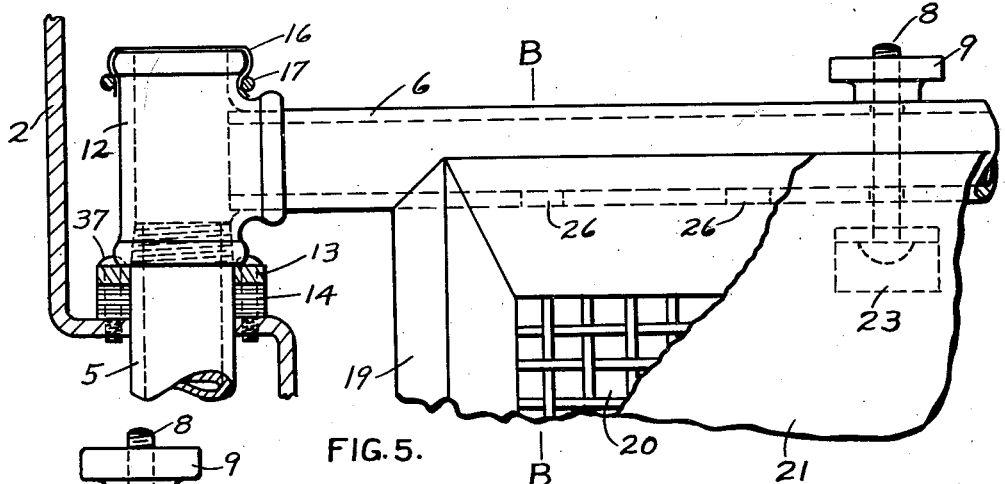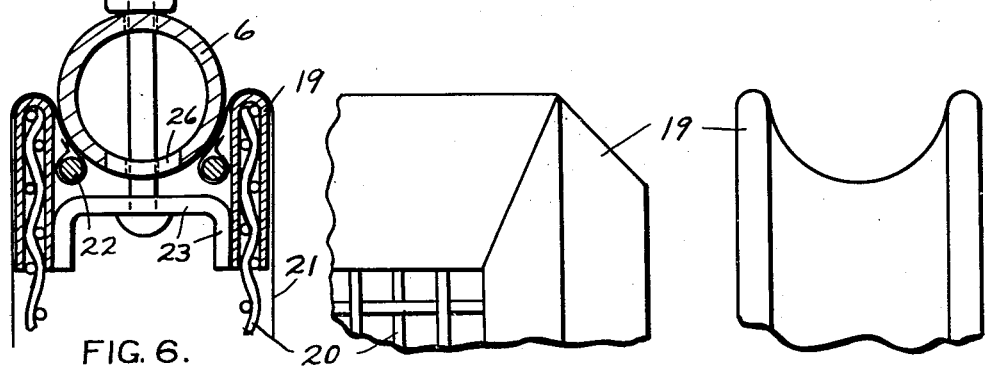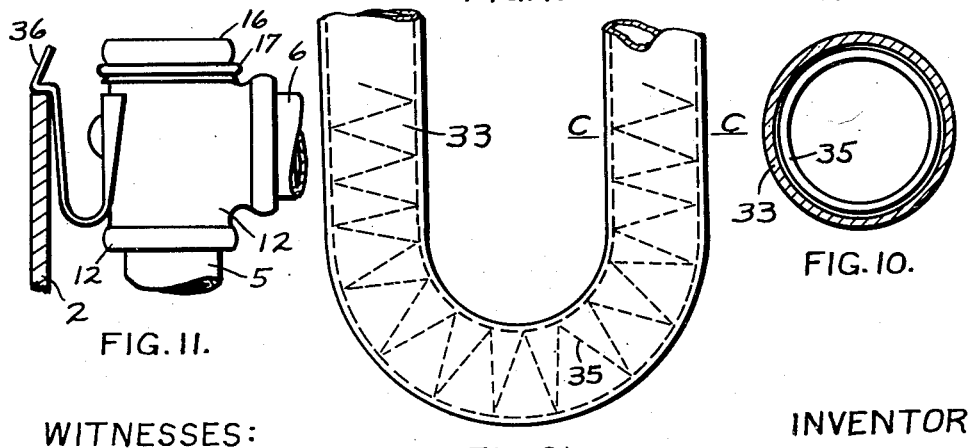

ARTHUR J. BROWN, OF MILWAUKEE, WISCONSIN.

FILTER.

1,250,275.      Specification of Letters Patent.      Patented Dec. 18, 1917.

Application filed January 15, 1917. Serial No. 142,546.

*To all whom it may concern:*

Be it known that I, ARTHUR J. BROWN, a citizen of the United States, residing at Milwaukee, in the county of Milwaukee and State of Wisconsin, have invented certain new and useful Improvements in Filters, of which the following is a specification.

This invention relates to filters and more particularly to filters of the cell or bag type, though the invention in all of its aspects is not limited to use with this particular class of filters.

It is the object of this invention to prevent any unfiltered liquid from passing through the filter, when any of the cells are removed.

The invention further relates to improvements in details, such as spacers fastened to the bags or frames, which prevent adjacent cells from coming close together and thereby reduce the filtering surface.

The invention further relates to the partition between adjacent compartments, which permits the liquid to overflow the partition, before it can overflow the tank.

The various features of novelty which characterize this invention, are pointed out with particularity in the claims annexed to and forming a part of this specification.

For a better understanding of the invention, however, reference may be had to the accompanying drawings, also forming a part of the specification of this invention.

Figures 1, 3A:
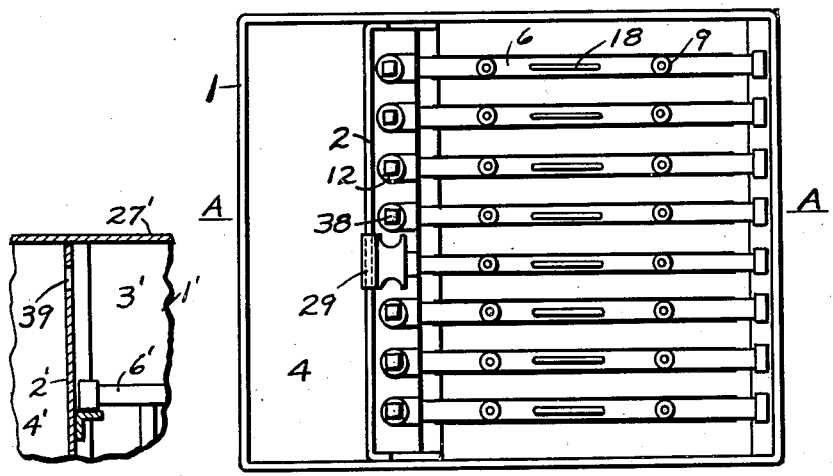
Figures 2, 3:
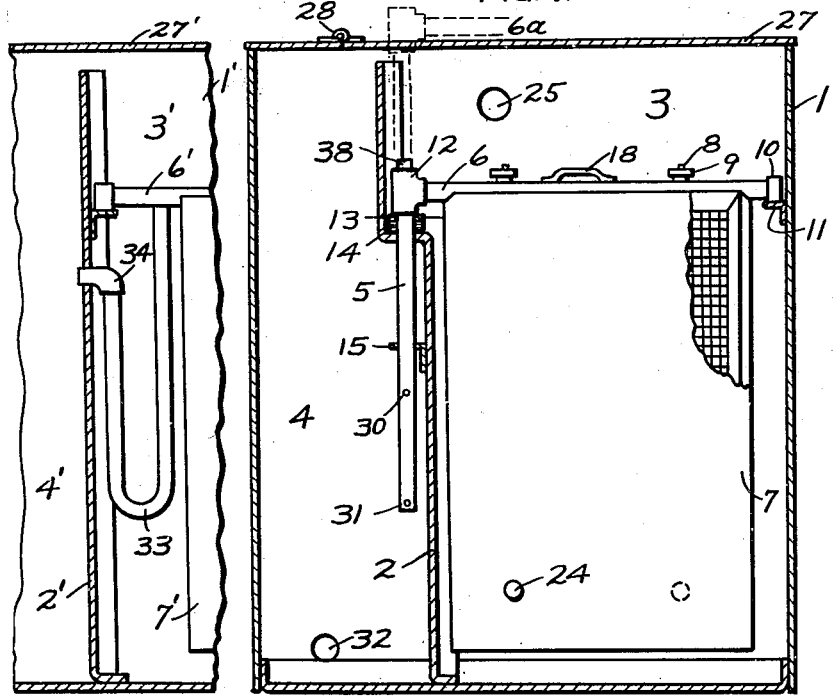
Figure 4:

In the drawings, Figure 1 is a plan view of a filter embodying the invention, with the top removed; Fig. 2 is a sectional elevation taken at A—A in Fig. 1; Fig. 3 is a partial sectional elevation of a modification of the invention; Fig. 3ᴬ is also a modification; Fig. 4 is an end view of one cell; Figs. 5, 6, 7, 8, 9, 10 and 11 are enlarged views showing details; Fig. 5 being a detail of the cell, cell support and connection between compartments. Fig. 6, a section at B—B in Fig. 5. Fig. 7, a partial side view and Fig. 8, a partial end view of the cell. Fig. 9, a view of the hose connection 33 shown in Fig. 3. Fig. 10, a section through hose taken at C—C in Fig. 9, and Fig. 11, a view showing a method of holding T 12 in a raised position.

Referring to the drawings, 1 represents the tank of a filter, divided by a partition 2, into two compartments, of which the larger, 3, is the filtering compartment and the smaller, 4, is the compartment for receiving the filtrate.

In the partition 2 is a row of holes, through which pass the pipes 5, which together with pipes 6, form supports for the cells 7. The cells 7 are fastened to pipes 6 by means of screws 8 and nuts 9. One end of pipes 6 is closed by means of caps 10 which rest on shelf 11. The other end of pipes 6 slip into T's 12 to which are also connected pipes 5. T's 12 rest on plate 13, which clamps packing 14 against partition 2 by means of screws 37. Pipes 5 also pass through guide 15 which keeps them vertical. The tops of T's 12 are closed with plugs 38. Handle 18 is used for raising the cells and supports to the position indicated by dotted lines 6ᵃ.

Cells 7 consist of a frame 19, the sides of which consist of wire screen 20. The frames 19 are covered with cloth bags 21, which are open only at the top. Around the top edge of bags 21 is fastened a cord 22 which is clamped between the pipes 6 and frames 19, thus holding the bags in place. Screws 8 are fastened to spacers 23, which in turn are fastened to frames 19. The top corners of frames 19 are made semi-circular, as shown in Fig. 8, so as to clamp the bags 21 snugly between pipes 6 and frames 19.

Spacers 24 are fastened to the bags 21 so as to prevent the bags on adjacent cells from touching each other, which would reduce the filtering surface.

The operation of the filter is as follows: The liquid enters compartment 3 through hole 25. As compartment 3 fills, the cells 7 become submerged and the liquid passes through bags 21, to the inside of the cells. As the outlet of cells 7 is through pipes 6, there can be no discharge into compartment 4 until cells 7 become entirely submerged. As the liquid in compartment 3 submerges cells 7, the process of filtration begins; the filtrate rising inside of the cells 7 until it passes through holes 26 into pipes 6, T's 12, pipes 5 and then discharges into compartment 4. Hole 32 is the outlet of compartment 4.

When it becomes necessary to clean bags 21, it can be done without interrupting the process of filtering, by raising the cover 27, which is fastened by hinges 28, then raising one cell at a time, to the position 6ᵃ, which is above the top of the tank, then sliding runner 29 along the top of partition 2 until it supports T 12 in the raised position. Then slip pipe 6 out of T 12, which will then permit cell 7 with pipe 6, to be taken entirely out of the tank and bag 21 removed from frame 19 and cleaned. The cell having been cleaned and replaced, is lowered into its position in the tank, the inside of cell 7 and pipes 5 and 6, being full of air, which is forced out by the filtered liquid passing through bag 21. This air escapes through the sides of the bag, until the filtrate inside of cell 7 rises above the screen 20, after which it must escape through holes 26 and pipe 6. If the lower end of pipe 5 is not submerged in filtrate, the air will flow down and out of pipe 5; but when the lower end of pipe 5 is submerged, there will be an air lock, which will not be overcome until the head of liquid above pipe 6 is equal to the head above the lower end of pipe 5. To overcome this difficulty, hole 30 is drilled through pipe 5, which is not so likely to be submerged as is the lower end of pipe 5. Hole 30 is so located, that before it can be raised above the packing 14, pin 31 will be caught by guide 15.

As another means of overcoming this air lock, the top of T 12 is covered with a cloth cap or screen 16, held in place by clamp 17 and used as a vent, thus allowing all air to escape from pipes 5 and 6.

Partition 2 is made so that it stops short of the top of tank 1, so that in case the liquid enters compartment 3 faster than it can be filtered, it will overflow into compartment 4 instead of overflowing the tank, thus preventing loss. Fig. 3ᴬ shows another method of accomplishing the same purpose, by running partition 2′, the full height of tank and providing holes 39 for the liquid to flow through.

It will be seen, that with this design of filter, it is possible to change the bags without interrupting the operation of the filter and without any leakage between compartments 3 and 4, as the communication between the compartments is cut off by raising pipe 5 so that its upper inlet is above the level of the liquid.

Fig. 3 shows a modified form of this invention, in which a flexible pipe or hose 33, is used in place of the sliding connection shown in Fig. 2. The filtered liquid flows from compartment 3′ into cell 7′, then through pipe 6′, hose 33, elbow 34 and into compartment 4′. The flexible hose 33 permits cell 7′ to be lifted out of tank 1′ for the purpose of cleaning the bag. A coil spring 35 is placed on the inside of hose 33, to prevent it from collapsing when it is bent.

Fig. 11 shows a modified means of supporting T 12 in the raised position of 6ª, in place of using runner 29. Spring clip 36 is fastened to T 12, so that when T 12 is raised above partition 2, clip 36 springs out over partition 2 and holds T 12 in the raised position, until clip 36 is forced back against T 12.

The filter herein described is capable of being modified in construction in various ways, without departing from the essential principle of the invention and it is desired not to be limited to the particular details of construction herein shown and described.

It is claimed and desired to secure by Letters Patent:

1. In a filter of the cell type, a cell consisting of a frame, a bag inclosing said frame and a conduit connecting said frame with a compartment of said filter, said bag being clamped between said frame and said conduit.

2. In a filter of the cell type, a cell consisting of a frame, a bag over said frame and a conduit connecting said cell with a compartment in said filter, said bag being clamped between said frame and said conduit, said conduit also supporting said cell.

3. In a filter, the combination of a tank providing compartments, a partition separating said compartments, a filtering cell, a pipe connecting said filtering cell with one of said compartments and a hole in said partition in which said pipe may slide when said cell is raised or lowered.

4. In a filter, the combination of a tank providing a compartment, filtering cells in said compartment, sliding conduit connections between said filtering cells and the exterior of said compartment and a sliding runner on a wall of said compartment, said runner serving as a support for any of said cells and connections when in raised position.

ARTHUR J. BROWN.